Jan. 21, 1964     H. F. FLOWERS     3,118,699
DOUBLE WEBBED WHEEL ASSEMBLY
Filed Jan. 19, 1962
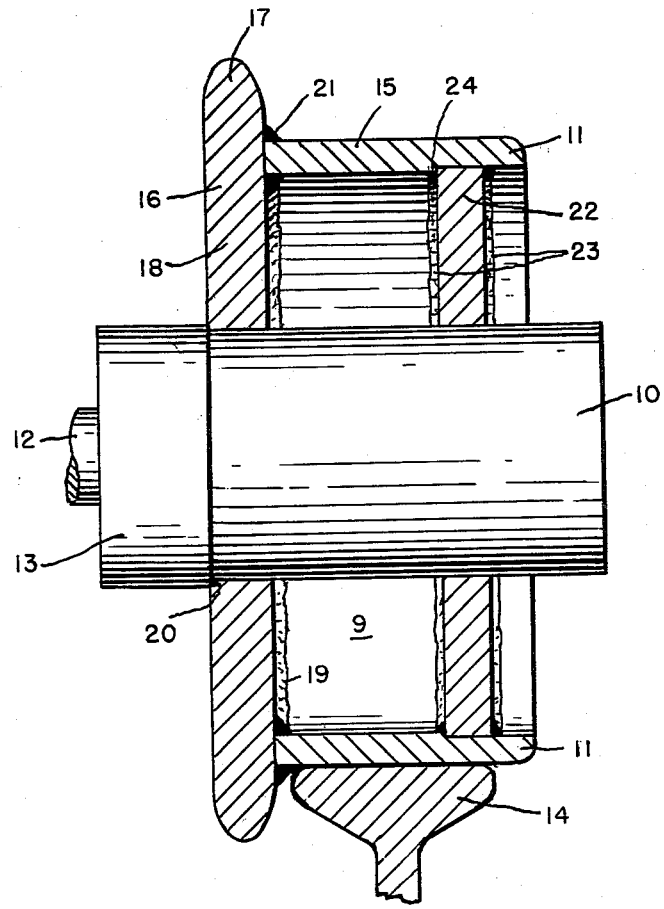
HENRY FORT FLOWERS
*INVENTOR*
BY *Mason, Porter, Miller & Stewart*
ATTORNEYS _3,118,699_
_Patented Jan. 21, 1964_

3,118,699
DOUBLE WEBBED WHEEL ASSEMBLY
Henry Fort Flowers, P.O. Box 238, Findlay, Ohio
Filed Jan. 19, 1962, Ser. No. 167,231
2 Claims. (Cl. 295—21)

The present invention generally relates to railway wheels, and in particular to a double-webbed wheel rim for use in mine car wheels and the like.

Wheel rims of this type which are used to support mine cars and the like, are subjected to rough, heavy and continuous use and therefore must be extremely strong and of a practical and relatively simple design.

In the industry it is, therefore, often desirable to be able to replace a worn wheel rim with a new wheel rim without disturbing the supporting structure upon which the wheel rim rests.

It is, therefore, an object of the invention to provide a wheel rim which is of strong and simple construction and which may be readily used as a replacement for a worn wheel rim.

Another object of the invention is to provide a rail wheel assembly in which the wheel rim is held on the wheel hub by a frictional or wedge-fitting engagement so that the wheel rim may be easily removed therefrom and replaced with a new wheel rim.

It is also an object of the invention to provide a rail wheel rim which is of simple, strong construction and is provided with a cylindrical tread surface, a rail-engaging flange portion and inwardly extending webs which are adapted for press or wedge-fitting engagement with a wheel hub whereby the wheel rim may be easily removed from the wheel hub.

A further object of the invention is to provide a wheel so constructed that a new tread and wheel rim portion may be provided on a worn wheel without the necessity of remachining the hub of the wheel, the wheel rim being formed of simple, strong and welded construction.

A still further object of the invention is to provide a wheel adapted for press or wedge-fitting engagement with a tubular wheel hub in which the wheel rim is constructed of two annular, spaced plates welded to a cylindrical rail-engaging tread or rim portion.

Still another object of the invention is to provide a double-webbed wheel rim of welded construction which has a continuous circumferential welded bead disposed at the intersection of its cylindrical tread portion and its rail-engaging flange for increased rail contact and especially when the vehicle upon which the wheel rim is utilized, is travelling along a section of curved track.

With the above and other objects in view, as will appear hereinafter, the nature of the invention will be more clearly understood by reference to the following detailed description and the accompanying drawing of the preferred form.

The drawing is a side elevational view, partly in vertical section, of the built-up railway wheel of the present invention.

As shown in the drawing, a typical wheel assembly 9 consists of a wheel hub 10, which may be tubular, and a wheel rim 11. The wheel may be supported for rotation upon an axle 12 in a known manner and which comprises no part of the present invention. The wheel hub 10 is formed of easily machinable material such as steel and is provided with an enlarged portion 13 provided at the end toward the supported vehicle. The wheel assembly is adapted for operation over a rail 14.

The wheel rim 11 is double-webbed and is provided with a cylindrical tread 15 which may be formed of a hardened, tough and wear-resistant material such as steel. An annular plate or web 16 is provided at the inner end of the cylindrical tread portion 15 and forms therewith a rail-engaging flange 17 and a supporting web portion 18. The annular web 16 and the cylindrical tread 15 are welded together along their inner juncture by a weld bead 19. It is apparent from the drawing that the flange 17 extends outwardly from the cylindrical tread 15 while the web portion 18 extends integrally from the flange portion 17 and inwardly of the cylindrical tread 15. The inner edge of the portion 13 is further provided with a shoulder portion 20, the function of which will be hereinafter explained.

As clearly shown in the drawing, the inner portion of the cylindrical tread 15 abuts the annular web 16 just below its flange portion 17. A circumferential welded bead 21 is provided at this outer intersection of these two members. This welded bead 21 not only aids in attaching the annular web to the circumferential tread but further is of particular use when the wheeled vehicle is moving on a curved portion of the rail 14, as the welded bead 21 provides a ramp or rail-engaging portion which further aids in the retention of the wheel assembly on the rail 14.

A second annular plate or web 22 extends from the cylindrical tread 15 inwardly therefrom and is adapted to form a wedging fit between the wheel rim 11 and the hub 10 at its lower or inner edge. This second annular web 22 abuts the cylindrical tread 15 along its inner circumference and is welded thereto by means of welds 23 similar to the weld 19 utilized for joining the annular flange 16 to the cylindrical tread 15. It should be noted at this time that the second flange 22 forms a second web portion which is spaced along the cylindrical tread 15 remotely from the first web portion 18 and parallel thereto and thereby assures that the stresses transmitted from the wheel rim 11 to the hub 10 are spread over a more effective area of the latter. The cylindrical tread 15 may be further provided with an inner shoulder portion 24 spaced from its outer edge, and this further acts to seat the second web portion 22 on the cylindrical tread 15, the inner diameter of the tread at this point being enlarged.

The wheel rim 11 is built up as follows. The first cylindrical tread 15 is welded to the first web 16 by means of welds 19 and 21 respectively. The second web 22 is then seated in the cylindrical tread 15 by means of welds 23 and the inner edges of the webs are machine bored to dimensions requiring a press fit with the hub 10. Alternatively, the plates 16 and 22 may be bored prior to their assembly with the cylindrical tread 15. The wheel rim 11 is then locally heat-treated if such is desired, and forced onto the tubular hub until the web portion 18 abuts the shoulder 20 of enlarged portion 13 of the hub 10. The wheel rim 11 may be heated to aid in its assembly with the hub 10.

The double-webbed wheel 9, when the rim 11 is worn to the point of requiring replacement, is removed from the tubular hub, the old rim removed from both webs and a new wheel rim placed thereon.

It is thus apparent that there has herein been provided a novel and useful double-webbed wheel assembly from which the worn rim may be easily replaced with another wheel rim. The replacement of the wheel rim alone in this manner affords a considerable cost saving over the replacement of an entire wheel assembly. The wheel rim 11 being formed of individual component webs 16 and 22 and rim 15 is further more easily and quickly constructed than previous one-piece wheel rims such as those formed by forging or casting. It is further seen that by using the welded construction of the present invention, a wheel assembly may be built up which affords more latitude in construction than previously forged or cast wheels.

Large tooling-up costs, inherently involved in casting or forging procedures, are not necessary with the welded construction of this invention, and replacement wheel rims particularly adapted for distinctive uses can be thus economically produced and assembled.

It is apparent that changes in the details of construction, materials and proportions may also be made without departing from the scope of the invention as set forth in the appended claims.

What I claim is:

1. A double webbed rail wheel assembly having a hub, a web having a peripheral flange, a wheel rim with one edge fixedly attached to the web inwardly of the flange, said rim having an internal shoulder spaced from its opposite edge, and a second web fixedly attached to the inside of the rim against said shoulder, the inner edges of both webs being press fitted to the hub.

2. A rail wheel assembly comprising a hub having a peripheral shoulder, a web frictionally mounted on the hub against the said shoulder, a peripheral flange on the web, a wheel rim with one edge welded to the web inwardly of the flange, said rim having a circumferential shoulder on its inner surface at its opposite end and a second web welded to the rim opposite said shoulder, said second web being frictionally held by said hub.

References Cited in the file of this patent
UNITED STATES PATENTS

| | | |
|---|---|---|
| 417,996 | Dunstedter | Dec. 24, 1889 |
| 2,574,323 | Flowers | Nov. 6, 1951 |
| 2,590,567 | Osborne | Mar. 25, 1952 |